United States Patent
Yamakawa (10) Patent No.: US 6,577,451 B2
(45) Date of Patent: Jun. 10, 2003

(54) REAR CONVERSION LENS

(75) Inventor: Hiromitsu Yamakawa, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/093,383

(22) Filed: Mar. 11, 2002

(65) Prior Publication Data

US 2002/0191303 A1 Dec. 19, 2002

(30) Foreign Application Priority Data

Mar. 27, 2001 (JP) ........................................ 2001-090816

(51) Int. Cl.$^7$ ................................................. G02B 15/14
(52) U.S. Cl. ........................................ 359/690; 359/689
(58) Field of Search ................................. 359/689, 690, 359/645, 716

(56) References Cited

U.S. PATENT DOCUMENTS

| | | | | |
|---|---|---|---|---|
| 4,154,508 A | * | 5/1979 | Nakamura | 359/675 |
| 4,655,558 A | * | 4/1987 | Hamanishi | 396/71 |
| 5,253,112 A | * | 10/1993 | Suzuki et al. | 359/675 |

FOREIGN PATENT DOCUMENTS

| | | | | |
|---|---|---|---|---|
| JP | 60029718 A | * | 2/1985 | G02B/15/12 |
| JP | 60091319 A | * | 5/1985 | G02B/15/12 |
| JP | 60111215 A | * | 6/1985 | G02B/15/12 |
| JP | 61219918 A | * | 9/1986 | G02B/15/12 |
| JP | 63-200113 | | 8/1988 | |
| JP | 63-301916 | | 12/1988 | |
| JP | 05142473 A | * | 6/1993 | G02B/15/12 |

* cited by examiner

*Primary Examiner*—Evelyn Lester
*Assistant Examiner*—Jack Dinh
(74) *Attorney, Agent, or Firm*—Arnold International; Bruce Y. Arnold (57) ABSTRACT

A rear conversion lens, for attachment to the rear of a main lens, is formed of only three lens groups of positive, negative, and positive refractive power, respectively, in order from the object side. The first lens group is formed of a first lens element of negative meniscus shape with its convex surface on the object side, and a second lens element of positive refractive power that is biconvex. The second lens group is formed of a third lens element that is biconcave, and a fourth lens element of negative refractive power with a concave surface on the object side. The third lens group is formed of a fifth lens element that is biconvex, and a sixth lens element of negative meniscus shape with its convex surface on the image side. Various conditions are satisfied to facilitate ease of manufacture and to assure good optical performance.

4 Claims, 10 Drawing Sheets

REAR CONVERSION LENS

BACKGROUND OF THE INVENTION

Conversion lenses for changing the focal length of a main lens system of a photographic camera are known in the prior art. Those designed for mounting in front of a main lens system are called front conversion lenses and those designed for mounting in back of a main lens system are called rear conversion lenses.

Examples of rear conversion lenses are described in Japanese Laid Open Patent Applications S63-200113 and S63-301916. The rear conversion lens described in Japanese Laid Open Patent Application S63-200113 extends the focal length of the main lens system by a factor of about 1.4 using a four lens group, five lens element construction. This conversion lens provides excellent optical performance for cameras that use 35 mm film. The rear conversion lens described in Japanese Laid Open Patent Application S63-301916 extends the focal length of a main lens system by a factor of 2.0 using a six lens element construction. This conversion lens also provides excellent optical performance for cameras that use 35 mm film.

However, although the rear conversion lenses as described above provide excellent optical performance using 35 mm film, there is a problem if such a lens is used with a camera that uses film of an even larger size, such as BROWNIE film size (6 cm×4.5 cm). More particularly, such conversion lenses provide insufficient optical performance for cameras that employ BROWNIE film size, where the focal length must be extended by a factor of about 1.7.

BRIEF SUMMARY OF THE INVENTION

The object of the present invention is to provide a rear conversion lens which enables the focal length of a main lens system to be extended by a factor of 1.5 to 2, while providing good optical performance for cameras that use a film size larger than 35 mm film, such as BROWNIE film size (6 cm×4.5 cm) or larger.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention relates to a rear conversion lens for insertion between a camera lens and its image surface in order to extend the focal length of the camera lens, e.g., by a factor of about 1.5 to 2.0. The rear conversion lens of the invention is well-suited for use with photographic cameras, particularly with cameras having a large film size, such as a BROWNIE camera.

In the rear conversion lens of the present invention, good optical performance is provided for cameras that use BROWNIE size film (6 cm×4.5 cm) or larger by extending the focal length of a main lens system by a factor of about 1.5–2.0, while, preferably, satisfying the following Conditions (1) to (4):

| | |
|---|---|
| $N_3 > 1.8$ | Condition (1) |
| $N_4 > 1.8$ | Condition (2) |
| $N_5 < 1.6$ | Condition (3) |
| $N_6 > 1.8$ | Condition (4) | where
$N_3$ is the index of refraction of the third lens element,
$N_4$ is the index of refraction of the fourth lens element,
$N_5$ is the index of refraction of the fifth lens element, and
$N_6$ is the index of refraction of the sixth lens element.

Moreover, it is also desirable that the rear conversion lens of the present invention satisfies the following Conditions (5) and (6):

| | |
|---|---|
| $-0.28 < f_{34}/f_{12} < -0.18$ | Condition (5) |
| $0.5 < f_3/f_4 < 2.0$ | Condition (6) | where
$f_{12}$ is the focal length of the first lens group,
$f_{34}$ is the focal length of the second lens group,
$f_3$ is the focal length of the third lens element, and
$f_4$ is the focal length of the fourth lens element.

Figure 1:
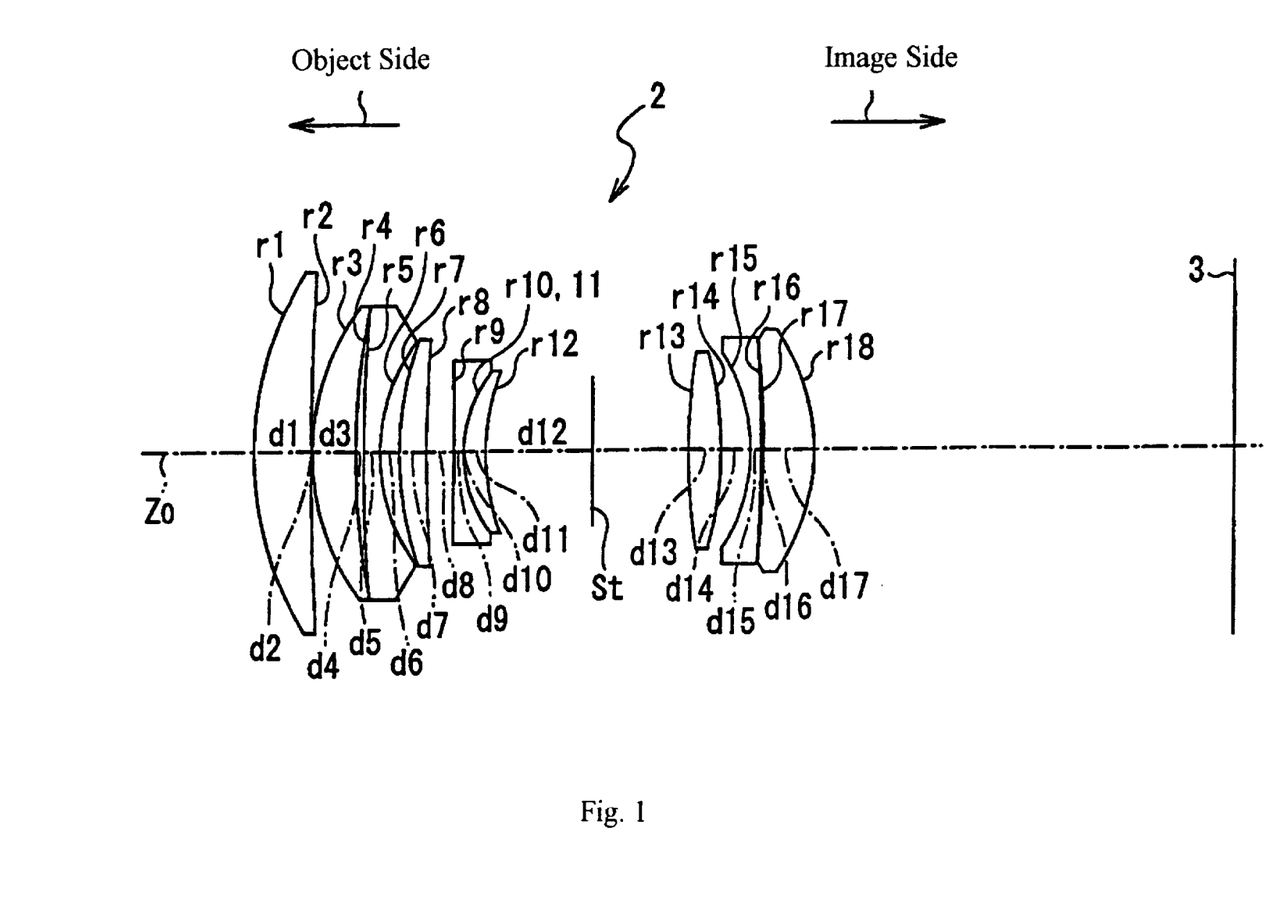
FIG. 1 shows the basic lens element configuration of a main lens, to which the rear conversion lens of the invention may be attached.
Figure 2:
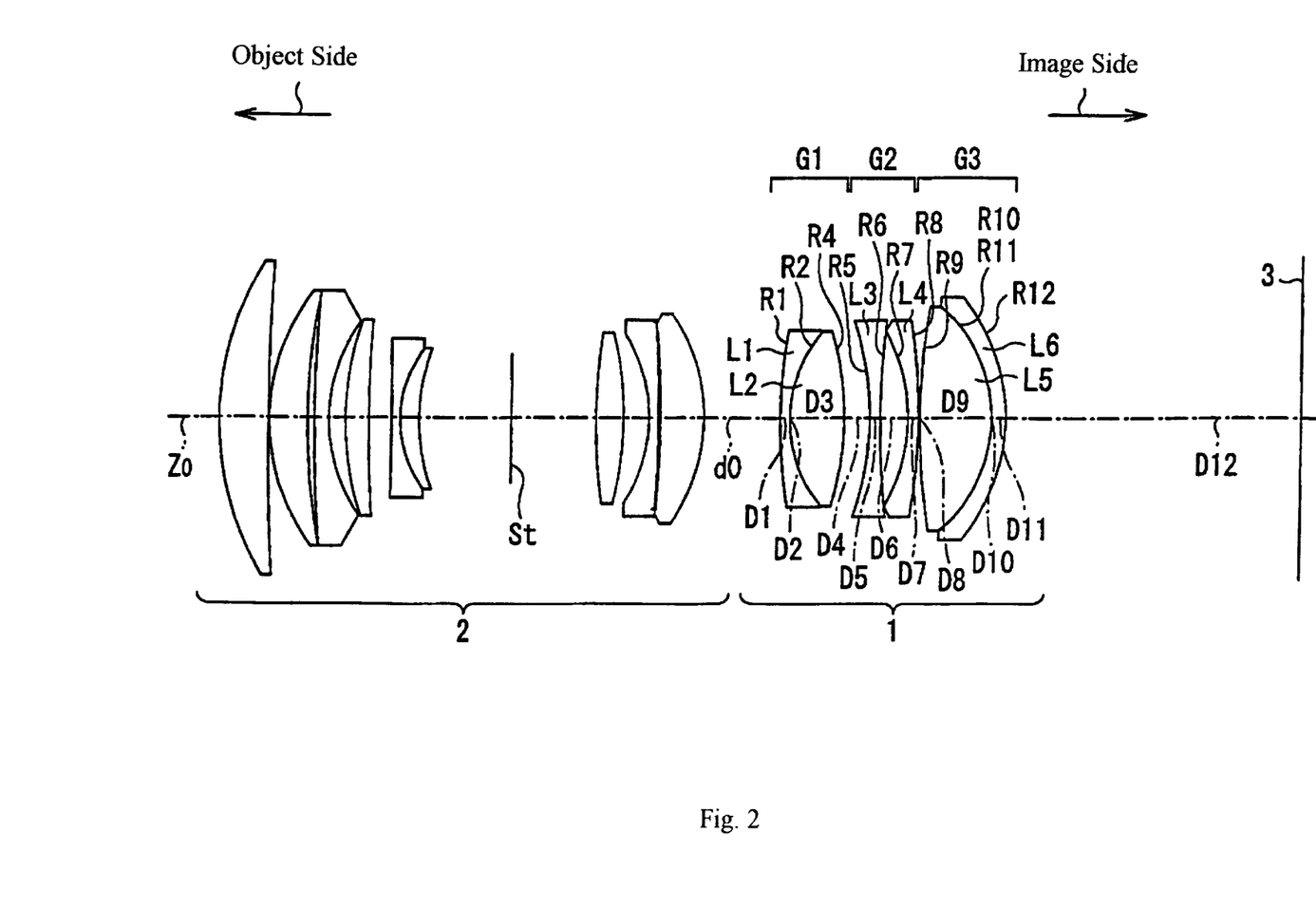
FIG. 2 shows the rear conversion lens of the invention when attached to the main lens illustrated in FIG. 1.

FIG. 1 shows the lens element configuration of a main lens 2 to which the rear conversion lens of the invention may be mounted. FIG. 2 shows the rear conversion lens 1 of the present invention mounted between the rear portion of the main lens 2 and its image surface 3. The main lens contains a stop St, as illustrated, and $Z_0$ represents the optical axis.

The rear conversion lens of the present invention is mainly for use with a camera that uses BROWNIE film size (6 cm×4.5 cm) or larger size film. As shown in FIG. 2, this rear conversion lens 1 is provided with a first lens group G1, a second lens group G2 and a third lens group G3, in order from the object side. The first lens group G1 has positive refractive power and is composed of a first lens element $L_1$ of negative meniscus shape with its convex surface on the object side, and a second lens element $L_2$ that is biconvex. The second lens group G2 has negative refractive power and is composed of a third lens element $L_3$ that is biconcave and a fourth lens element $L_4$ of negative refractive power with a concave surface on the object side. The third lens group G3 has positive refractive power and is composed of a fifth lens element $L_5$ that is biconvex and a sixth lens element $L_6$ of negative refractive power that has a meniscus shape with its convex surface on the image side.

The focal length of the main lens 2 is extended by a factor of 1.7 by inserting the rear conversion lens of the invention between the main lens 2 and its image surface 3 at a specified distance d0 from the rear surface of the main lens.

The purpose of the above Conditions (1)–(6) will now be discussed. If Conditions (1)–(4) are not satisfied, the Petzval sum becomes too small and the astigmatism becomes too large. Thus, a high quality image is not obtained. More particularly, there is a deterioration of optical performance at wide image angles when combined with a main lens having a short focal length.

If the lower limit of Condition (5) is not satisfied, astigmatism will not be sufficiently corrected, particularly at wide image angles, when the overall lens system has a short focal length. On the other hand, if the upper limit of Condition (5) is not satisfied, the curvature of field becomes too large, particularly at wide image angles, when the main lens has a short focal length. Moreover, the spherical aberration increases and optical performance degrades considerably when the main lens has a low F number.

If the lower limit of Condition (6) is not satisfied, the power of the third lens element $L_3$ is too high and the required accuracy of manufacture and positioning of the third lens element $L_3$ becomes strict. On the other hand, if the upper limit of Condition (6) is not satisfied, the power required of the fourth lens element $L_4$ is too high and the required accuracy of the manufacture and positioning of the fourth lens element $L_4$ becomes strict. Moreover, if the value $f_3/f_4$ does not satisfy both the lower and upper limits of Condition (6), the spherical aberration becomes difficult to correct, and optical performance deteriorates, particularly when a main lens of low F number is used.

As described above, the rear conversion lens 1 of the present invention enables the focal length of the main lens 2 to be extended by a factor of about 1.5 to 2.0 while providing good optical performance for cameras that use BROWNIE film size (6 cm×4.5 cm) or larger.

A specific example of a main lens, to which the rear conversion lens of the invention may be attached, will now be given.

Table 1 below lists the surface #, in order from the object side, the radius of curvature r (in mm) of each surface, the spacing d (in mm) between surfaces, as well as the index of refraction $N_e$ (for the e-line, $\lambda$=546.1 nm) and the Abbe number $v_d$ (for the d-line, $\lambda$=587.6 nm) of each lens element of a main lens to which the rear-attachment lens of the invention may be attached. In the bottom portion of the table are listed the focal length f (in mm), the f number $F_{NO}$, and the half-image angle $\omega$ of the main lens by itself. Note that the data in the table has been normalized to yield a focal length of 1 mm; however, the focal length of a main lens for a 4.5 cm×6 cm film size is about 150 mm, and the focal length of a main lens for a 6 cm×8 cm film size is about 200 mm.

TABLE 1

| # | r | d | $N_e$ | $v_d$ |
|---|---|---|---|---|
| 1 | 0.42343 | 0.07107 | 1.77621 | 49.6 |
| 2 | 3.85964 | 0.00160 | | |
| 3 | 0.30558 | 0.05400 | 1.49845 | 81.6 |
| 4 | 0.94549 | 0.00973 | | |
| 5 | 2.15041 | 0.02033 | 1.69416 | 31.2 |
| 6 | 0.23598 | 0.02393 | | |
| 7 | 0.42167 | 0.03333 | 1.49845 | 81.6 |
| 8 | 1.92800 | 0.03327 | | |
| 9 | −7.90178 | 0.01200 | 1.67380 | 57.2 |
| 10 | 0.16670 | 0.00000 | | |
| 11 | 0.16670 | 0.02667 | 1.83932 | 37.2 |
| 12 | 0.27822 | 0.25294 | | |
| 13 | 0.80694 | 0.04000 | 1.56433 | 45.3 |
| 14 | −0.49884 | 0.03713 | | |
| 15 | −0.22037 | 0.01333 | 1.72538 | 34.7 |
| 16 | −2.21253 | 0.00320 | | |
| 17 | −1.32331 | 0.06347 | 1.77621 | 49.6 |
| 18 | −0.25914 | | | |
| | f = 1.0 | $F_{NO}$ = 3.2 | $\omega$ = 13.1° | |

Several embodiments of the attachment lens according to the invention will now be described in detail. The lens data of the various embodiments has been scaled so that the given data is consistent for attachment of the rear conversion lens to a main lens having a focal distance of unity. However, as noted above, the actual focal length of a main lens for 4.5 cm×6.0 cm size film is about 150 mm, and the actual focal length of a main lens for 6.0 cm×8.0 cm size film is about 200 mm.

Embodiment 1

Table 2 below lists the surface #, in order from the object side, the radius of curvature R (in mm) of each surface, the spacing D (in mm) between surfaces, as well as the index of refraction $N_e$ (for the e-line, $\lambda$=546.1 nm) and the Abbe number $v_d$ (for the d-line, $\lambda$=587.6 nm) of each lens element of the attachment lens of Embodiment 1. In the middle portion of the table are listed the spacing d0 between the rear surface of the main lens and the front surface of the attachment lens, as well as the focal length f (in mm) and magnification M when the attachment lens is attached to the main lens that is normalized to have unity focal length, as described above. In the bottom portion of the table are listed the values that correspond to each of the Conditions (1) to (6) for this embodiment.

TABLE 2

| # | R | D | $N_e$ | $v_d$ |
|---|---|---|---|---|
| 1 | 0.75505 | 0.01333 | 1.82017 | 46.4 |
| 2 | 0.19616 | 0.00000 | | |
| 3 | 0.19616 | 0.07667 | 1.59667 | 35.3 |
| 4 | −0.42348 | 0.03547 | | |
| 5 | −0.45037 | 0.01500 | 1.88815 | 40.8 |
| 6 | 1.22247 | 0.03867 | | |
| 7 | −0.25811 | 0.01500 | 1.88815 | 40.8 |
| 8 | −0.84753 | 0.00200 | | |
| 9 | 0.99127 | 0.10467 | 1.52033 | 58.6 |
| 10 | −0.20906 | 0.00000 | | |
| 11 | −0.20906 | 0.02000 | 1.88815 | 40.8 |
| 12 | −0.26895 | 0.41615 | | |
| d0 = 0.11017 | | f = −1.1186 | | M = 1.6740 |
| (1) $N_3$ | (2) $N_4$ | (3) $N_5$ | (4) $N_6$ | (5) $f_{34}/f_{12}$ | (6) $f_3/f_4$ |
| 1.88815 | 1.88815 | 1.52033 | 1.88815 | −0.2542 | 0.8725 |

As is apparent from comparing the above values of this embodiment corresponding to Conditions (1)–(6) with the Conditions (1)–(6), this embodiment satisfies each of the Conditions (1)–(6).

Figure 3A:
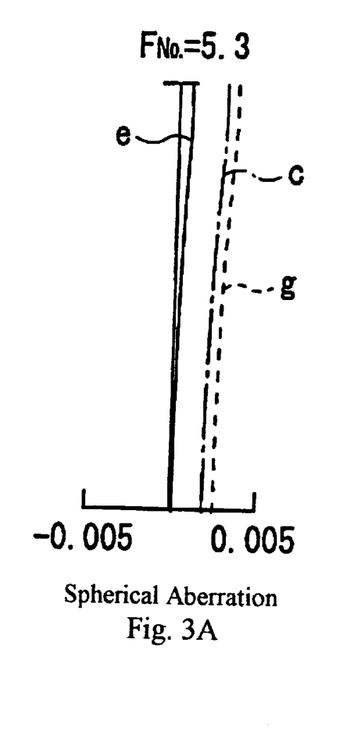
FIGS. 3A–3D show the spherical aberration (in mm), curvature of field (in mm), distortion and lateral color (in mm) of the rear conversion lens of Embodiment 1 when combined with a main lens.
Figure 3B:
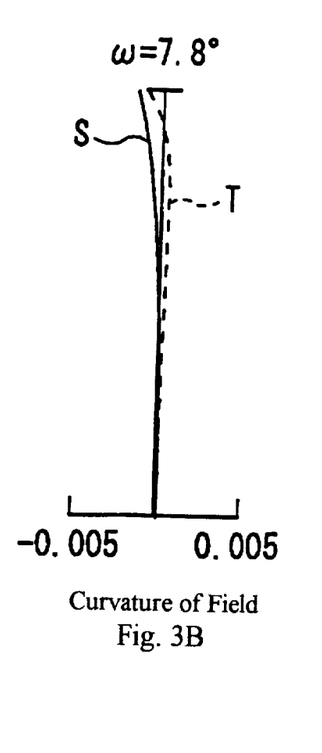
Figure 3C:
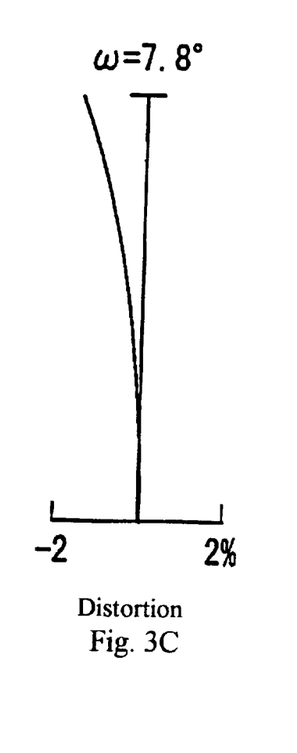
Figure 3D:
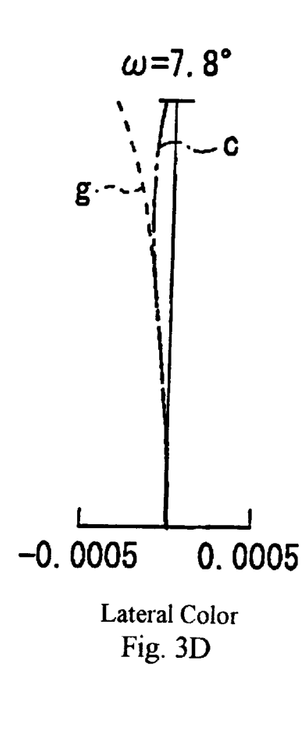

FIGS. 3A–3D show the spherical aberration (in mm), curvature of field (in mm), distortion and lateral color (in mm) of the rear conversion lens of Embodiment 1 when combined with a main lens having an f number of 3.2 and a focal length of 1. The aberrations illustrated are those of the e-line (λ=546.1 nm) unless noted otherwise. The wavelength of the C-line is 656.3 nm and of the g-line is 435.8 nm. Also, the curvature of field is illustrated in FIG. 3B for both the sagittal image plane S and the tangential (meridional) image plane T. In these figures, ω is the half-image angle and $F_{NO}$ is the F-number.

Embodiment 2

Table 3 below lists the surface #, in order from the object side, the radius of curvature R (in mm) of each surface, the spacing D (in mm) between surfaces, as well as the index of refraction $N_e$ (for the e-line, λ=546.1 nm) and the Abbe number $v_d$ (for the d-line, λ=587.6 nm) of each lens element of the attachment lens of Embodiment 2. In the middle portion of the table are listed the spacing d0 between the rear surface of the main lens and the front surface of the attachment lens, as well as the focal length f (in mm) and magnification M when the attachment lens is attached to the main lens that is normalized to have unity focal length, as described above. In the bottom portion of the table are listed the values that correspond to each of the Conditions (1) to (6) for this embodiment.

TABLE 3

| # | R | D | $N_e$ | $v_d$ |
|---|---|---|---|---|
| 1 | 0.73721 | 0.01333 | 1.82017 | 46.4 |
| 2 | 0.19959 | 0.00000 | | |
| 3 | 0.19959 | 0.07667 | 1.59667 | 35.3 |
| 4 | −0.44773 | 0.03894 | | |
| 5 | −0.44514 | 0.01533 | 1.88815 | 40.8 |
| 6 | 0.88810 | 0.03796 | | |
| 7 | −0.26110 | 0.01533 | 1.88815 | 40.8 |
| 8 | −0.65636 | 0.00333 | | |
| 9 | 0.88919 | 0.10333 | 1.52033 | 58.6 |
| 10 | −0.21449 | 0.00000 | | |
| 11 | −0.21449 | 0.02000 | 1.88815 | 40.8 |
| 12 | −0.28040 | 0.41624 | | |
| d0 = 0.10667 | | f = −1.1155 | | M = 1.6750 |
| (1) | (2) | (3) | (4) | (5) | (6) |
| $N_3$ | $N_4$ | $N_5$ | $N_6$ | $f_{34}/f_{12}$ | $f_3/f_4$ |
| 1.88815 | 1.88815 | 1.52033 | 1.88815 | −0.2520 | 0.6678 |

As is apparent from comparing the above values of this embodiment corresponding to Conditions (1)–(6) with the Conditions (1)–(6), this embodiment satisfies each of the Conditions (1)–(6).

Figure 4A:
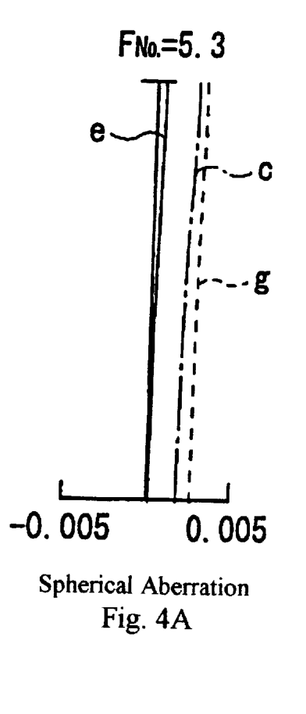
FIGS. 4A–4D show the spherical aberration (in mm), curvature of field (in mm), distortion and lateral color (in mm) of the rear conversion lens of Embodiment 2 when combined with a main lens.
Figure 4B:
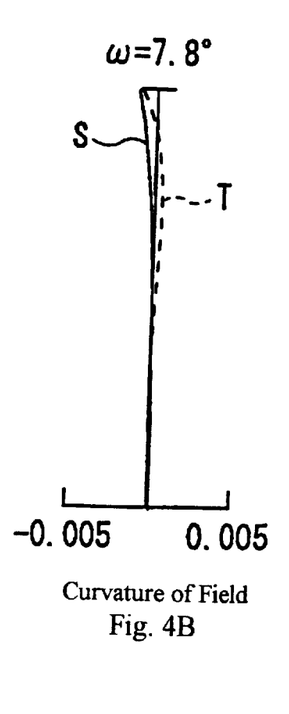
Figure 4C:
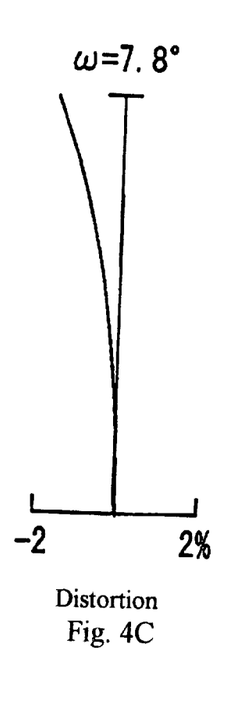
Figure 4D:
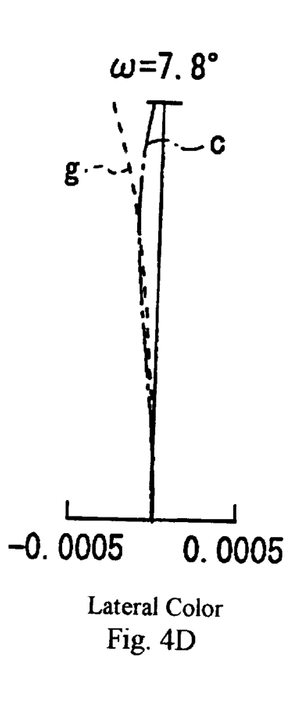

FIGS. 4A–4D show the spherical aberration (in mm), curvature of field (in mm), distortion and lateral color (in mm) of the rear conversion lens of Embodiment 2 when combined with a main lens having an f number of 3.2 and a focal length of 1. The aberrations illustrated are those of the e-line (λ=546.1 nm) unless noted otherwise. The wavelength of the C-line is 656.3 nm and of the g-line is 435.8 nm. Also, the curvature of field is illustrated in FIG. 4B for both the sagittal image plane S and the tangential (meridional) image plane T. In these figures, ω is the half-image angle and $F_{NO}$ is the F-number.

Embodiment 3

Table 4 below lists the surface #, in order from the object side, the radius of curvature R (in mm) of each surface, the spacing D (in mm) between surfaces, as well as the index of refraction $N_e$ (for the e-line, λ=546.1 nm) and the Abbe number $v_d$ (for the d-line, λ=587.6 nm) of each lens element of the attachment lens of Embodiment 3. In the middle portion of the table are listed the spacing d0 between the rear surface of the main lens and the front surface of the attachment lens, as well as the focal length f (in mm) and magnification M when the attachment lens is attached to the main lens that is normalized to have unity focal length, as described above. In the bottom portion of the table are listed the values that correspond to each of the Conditions (1) to (6) for this embodiment.

TABLE 4

| # | R | D | $N_e$ | $v_d$ |
|---|---|---|---|---|
| 1 | 0.74076 | 0.01333 | 1.82017 | 46.4 |
| 2 | 0.19723 | 0.00000 | | |
| 3 | 0.19723 | 0.07333 | 1.59667 | 35.3 |
| 4 | −0.45742 | 0.04000 | | |
| 5 | −0.45229 | 0.01533 | 1.88815 | 40.8 |
| 6 | 0.92370 | 0.04541 | | |
| 7 | −0.25545 | 0.01533 | 1.88815 | 40.8 |
| 8 | −0.64337 | 0.00333 | | |
| 9 | 1.03870 | 0.09786 | 1.52033 | 58.6 |
| 10 | −0.20126 | 0.00000 | | |
| 11 | −0.20126 | 0.02000 | 1.88815 | 40.8 |
| 12 | −0.26232 | 0.41656 | | |
| d0 = 0.10667 | | f = −1.1613 | | M = 1.6750 |
| (1) | (2) | (3) | (4) | (5) | (6) |
| $N_3$ | $N_4$ | $N_5$ | $N_6$ | $f_{34}/f_{12}$ | $f_3/f_4$ |
| 1.88815 | 1.88815 | 1.52033 | 1.88815 | −0.2424 | 0.6997 |

As is apparent from comparing the above values of this embodiment corresponding to Conditions (1)–(6) with the Conditions (1)–(6), this embodiment satisfies each of the Conditions (1)–(6).

Figure 5A:
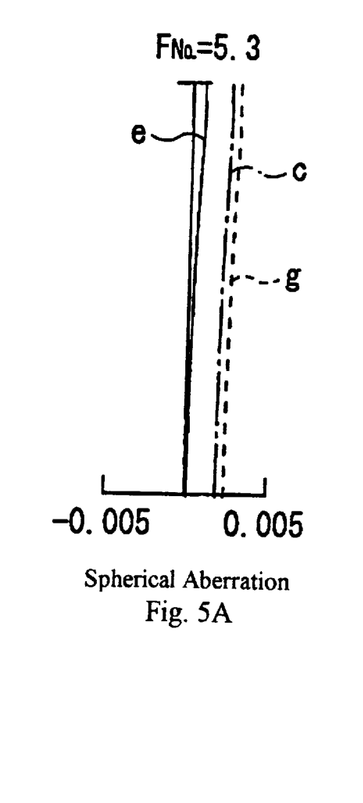
FIGS. 5A–5D show the spherical aberration (in mm), curvature of field (in mm), distortion and lateral color (in mm) of the rear conversion lens of Embodiment 3 when combined with a main lens.
Figure 5B:
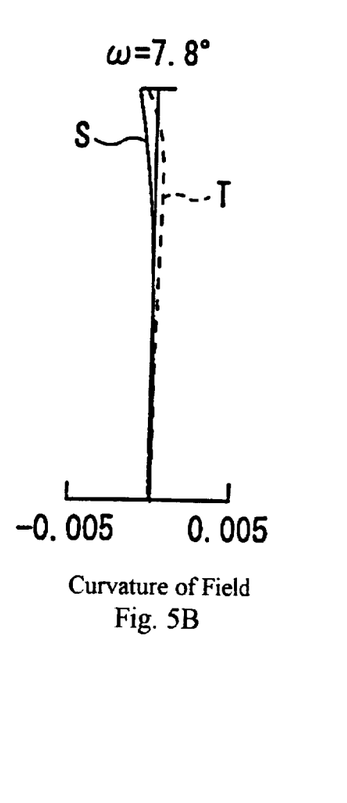
Figure 5C:
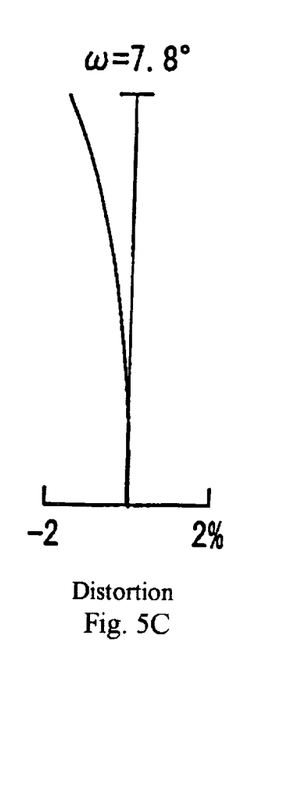
Figure 5D:
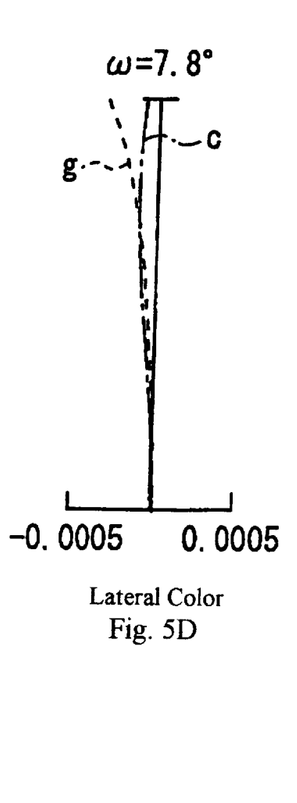

FIGS. 5A–5D show the spherical aberration (in mm), curvature of field (in mm), distortion and lateral color (in mm) of the rear conversion lens of Embodiment 3 when combined with a main lens having an f number of 3.2 and a focal length of 1. The aberrations illustrated are those of the e-line (λ=546.1 nm) unless noted otherwise. The wavelength of the C-line is 656.3 nm and of the g-line is 435.8 nm. Also, the curvature of field is illustrated in FIG. 5B for both the sagittal image plane S and the tangential (meridional) image plane T. In these figures, ω is the half-image angle and $F_{NO}$ is the F-number.

Embodiment 4

Table 5 below lists the surface #, in order from the object side, the radius of curvature R (in mm) of each surface, the spacing D (in mm) between surfaces, as well as the index of refraction $N_e$ (for the e-line, λ=546.1 nm) and the Abbe number $v_d$ (for the d-line, λ=587.6 nm) of each lens element of the attachment lens of Embodiment 4. In the middle portion of the table are listed the spacing d0 between the rear surface of the main lens and the front surface of the attachment lens, as well as the focal length f (in mm) and magnification M when the attachment lens is attached to the main lens that is normalized to have unity focal length, as described above. In the bottom portion of the table are listed the values that correspond to each of the Conditions (1) to (6) for this embodiment.

TABLE 5

| # | R | D | $N_e$ | $\upsilon_d$ |
|---|---|---|---|---|
| 1 | 4.62557 | 0.01333 | 1.77621 | 49.3 |
| 2 | 0.26893 | 0.00000 | | |
| 3 | 0.26893 | 0.07333 | 1.59667 | 35.3 |
| 4 | −0.41156 | 0.04000 | | |
| 5 | −0.53534 | 0.01533 | 1.88815 | 40.8 |
| 6 | −8.31025 | 0.04221 | | |
| 7 | −0.30530 | 0.01533 | 1.88815 | 40.8 |
| 8 | −5.57046 | 0.00333 | | |
| 9 | 0.64795 | 0.10092 | 1.51977 | 52.2 |
| 10 | −0.22296 | 0.00000 | | |
| 11 | −0.22296 | 0.02000 | 1.88815 | 40.8 |
| 12 | −0.32689 | 0.41666 | | |
| d0 = 0.10667 | | f = −0.9503 | | M = 1.7000 |
| (1) | (2) | (3) | (4) | (5) | (6) |
| $N_3$ | $N_4$ | $N_5$ | $N_6$ | $f_{34}/f_{12}$ | $f_3/f_4$ |
| 1.88815 | 1.88815 | 1.51977 | 1.88815 | −0.2177 | 1.7707 |

As is apparent from comparing the above values of this embodiment corresponding to Conditions (1)–(6) with the Conditions (1)–(6), this embodiment satisfies each of the Conditions (1)–(6).

Figure 6A:
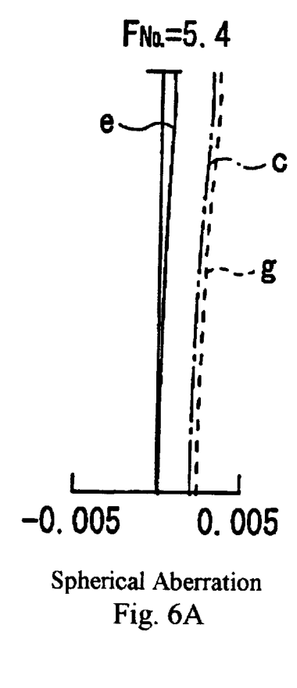
FIGS. 6A–6D show the spherical aberration (in mm), curvature of field (in mm), distortion and lateral color (in mm) of the rear conversion lens of Embodiment 4 when combined with a main lens.
Figure 6B:
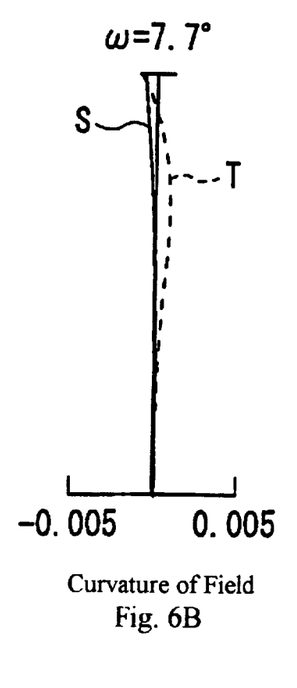
Figure 6C:
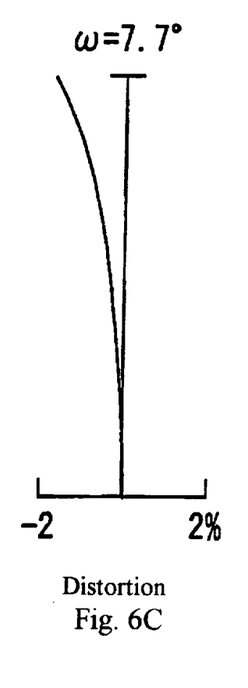
Figure 6D:
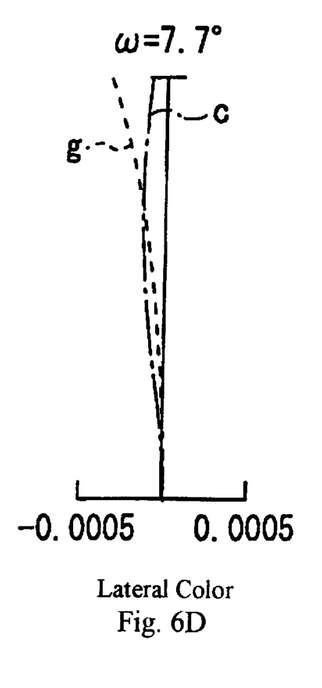

FIGS. 6A–6D show the spherical aberration (in mm), curvature of field (in mm), distortion and lateral color (in mm) of the rear conversion lens of Embodiment 4 when combined with a main lens having an f number of 3.2 and a focal length of 1. The aberrations illustrated are those of the e-line (λ=546.1 nm) unless noted otherwise. The wavelength of the C-line is 656.3 nm and of the g-line is 435.8 nm. Also, the curvature of field is illustrated in FIG. 6B for both the sagittal image plane S and the tangential (meridional) image plane T. In these figures, ω is the half-image angle and $F_{NO}$ is the F-number.

Embodiment 5

Table 6 below lists the surface #, in order from the object side, the radius of curvature R (in mm) of each surface, the spacing D (in mm) between surfaces, as well as the index of refraction $N_e$ (for the e-line, λ=546.1 nm) and the Abbe number $\upsilon_d$ (for the d-line, λ=587.6 nm) of each lens element of the attachment lens of Embodiment 5. In the middle portion of the table are listed the spacing d0 between the rear surface of the main lens and the front surface of the attachment lens, as well as the focal length f (in mm) and magnification M when the attachment lens is attached to the main lens that is normalized to have unity focal length, as described above. In the bottom portion of the table are listed the values that correspond to each of the Conditions (1) to (6) for this embodiment.

TABLE 6

| # | R | D | $N_e$ | $\upsilon_d$ |
|---|---|---|---|---|
| 1 | 7.85431 | 0.01333 | 1.77621 | 49.3 |
| 2 | 0.26796 | 0.00000 | | |
| 3 | 0.26796 | 0.07631 | 1.59667 | 35.3 |
| 4 | −0.39574 | 0.04000 | | |
| 5 | −0.46653 | 0.01533 | 1.88815 | 40.8 |
| 6 | −10.14167 | 0.05102 | | |
| 7 | −0.31603 | 0.01533 | 1.88815 | 40.8 |
| 8 | −1.91978 | 0.00333 | | |
| 9 | 0.66198 | 0.08914 | 1.51977 | 52.2 |
| 10 | −0.23023 | 0.00000 | | |
| 11 | −0.23023 | 0.02000 | 1.88815 | 40.8 |
| 12 | −0.34114 | 0.41667 | | |
| d0 = 0.10667 | | f = −0.9546 | | M = 1.7000 |
| (1) | (2) | (3) | (4) | (5) | (6) |
| $N_3$ | $N_4$ | $N_5$ | $N_6$ | $f_{34}/f_{12}$ | $f_3/f_4$ |
| 1.88815 | 1.88815 | 1.51977 | 1.88815 | −0.2222 | 1.2878 |

As is apparent from comparing the above values of this embodiment corresponding to Conditions (1)–(6) with the Conditions (1)–(6), this embodiment satisfies each of the Conditions (1)–(6).

Figure 7A:
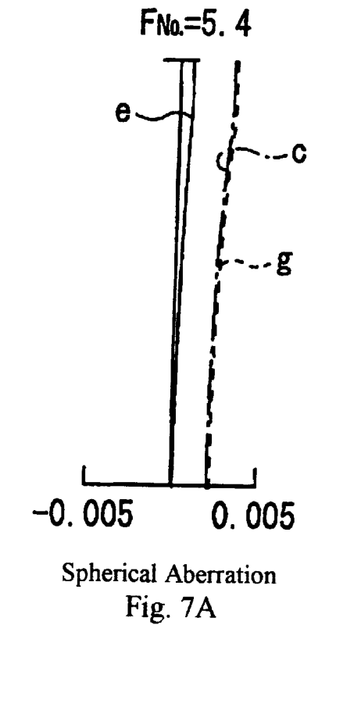
FIGS. 7A–7D show the spherical aberration (in mm), curvature of field (in mm), distortion and lateral color (in mm) of the rear conversion lens of Embodiment 5 when combined with a main lens.
Figure 7B:
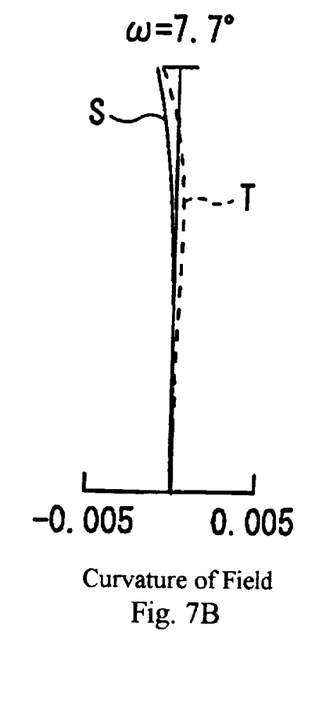
Figure 7C:
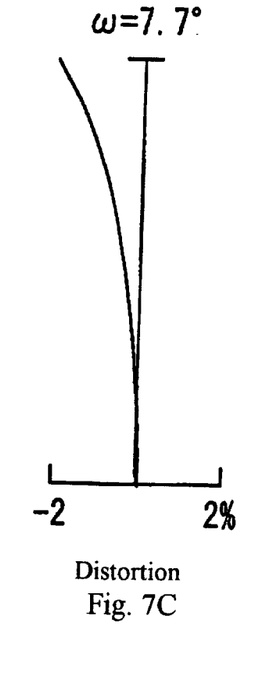
Figure 7D:
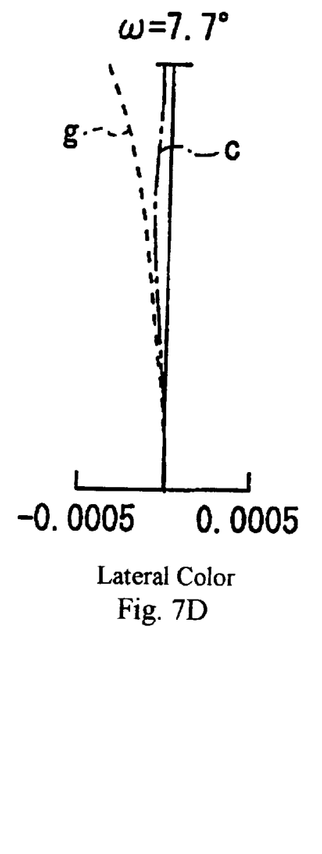

FIGS. 7A–7D show the spherical aberration (in mm), curvature of field (in mm), distortion and lateral color (in mm) of the rear conversion lens of Embodiment 5 when combined with a main lens having an f number of 3.2 and a focal length of 1. The aberrations illustrated are those of the e-line (λ=546.1 nm) unless noted otherwise. The wavelength of the C-line is 656.3 nm and of the g-line is 435.8 nm. Also, the curvature of field is illustrated in FIG. 7B for both the sagittal image plane S and the tangential (meridional) image plane T. In these figures, ω is the half-image angle and $F_{NO}$ is the F-number.

Embodiment 6

Table 7 below lists the surface #, in order from the object side, the radius of curvature R (in mm) of each surface, the spacing D (in mm) between surfaces, as well as the index of refraction $N_e$, (for the e-line, λ=546.1 nm) and the Abbe number $\upsilon_d$ (for the d-line, λ=587.6 nm) of each lens element of the attachment lens of Embodiment 6. In the middle portion of the table are listed the spacing d0 between the rear surface of the main lens and the front surface of the attachment lens, as well as the focal length f (in mm) and magnification M when the attachment lens is attached to the main lens that is normalized to have unity focal length, as described above. In the bottom portion of the table are listed the values that correspond to each of the Conditions (1) to (6) for this embodiment.

TABLE 7

| # | R | D | $N_e$ | $\upsilon_d$ |
|---|---|---|---|---|
| 1 | 10.26456 | 0.01333 | 1.75844 | 52.3 |
| 2 | 0.26742 | 0.00000 | | |
| 3 | 0.26742 | 0.07333 | 1.59667 | 35.3 |
| 4 | −0.39406 | 0.04000 | | |
| 5 | −0.46500 | 0.01533 | 1.88815 | 40.8 |
| 6 | −12.92680 | 0.04742 | | |
| 7 | −0.31612 | 0.01533 | 1.88815 | 40.8 |
| 8 | −1.95833 | 0.00333 | | |
| 9 | 0.66360 | 0.09571 | 1.51977 | 52.2 |
| 10 | −0.22923 | 0.00000 | | |
| 11 | −0.22923 | 0.02000 | 1.88815 | 40.8 |
| 12 | −0.34335 | 0.41666 | | |
| d0 = 0.10667 | | f = −0.9519 | | M = 1.7000 |
| (1) | (2) | (3) | (4) | (5) | (6) |
| $N_3$ | $N_4$ | $N_5$ | $N_6$ | $f_{34}/f_{12}$ | $f_3/f_4$ |
| 1.88815 | 1.88815 | 1.51977 | 1.88815 | −0.2307 | 1.2746 |

As is apparent from comparing the above values of this embodiment corresponding to Conditions (1)–(6) with the Conditions (1)–(6), this embodiment satisfies each of the Conditions (1)–(6).

Figure 8A:
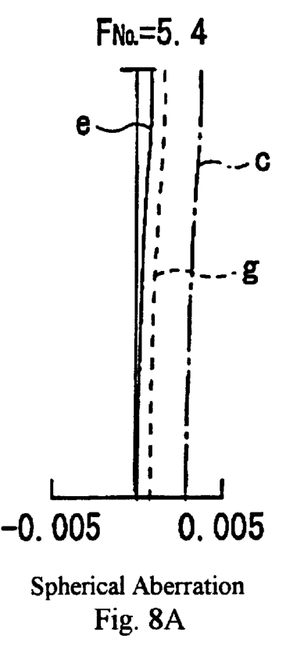
FIGS. 8A–8D show the spherical aberration (in mm), curvature of field (in mm), distortion and lateral color (in mm) of the rear conversion lens of Embodiment 6 when combined with a main lens.
Figure 8B:
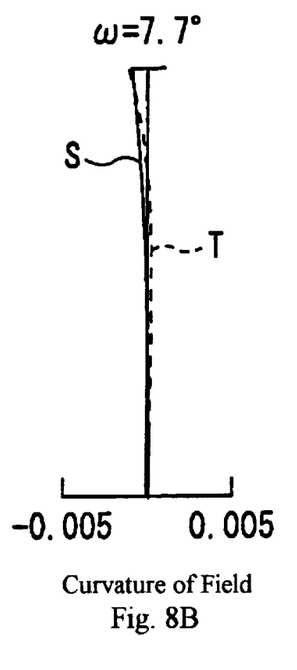
Figure 8C:
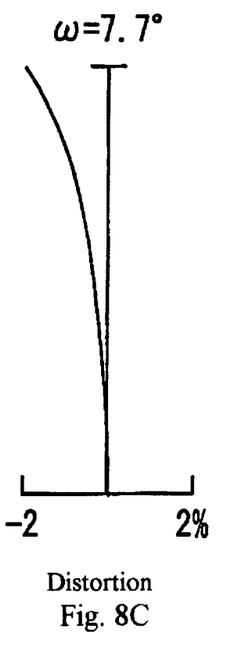
Figure 8D:
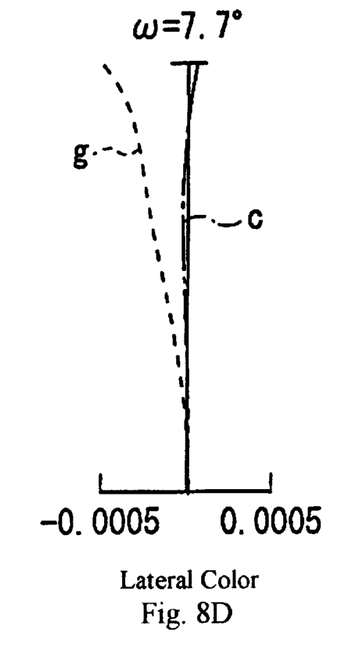

FIGS. 8A–8D show the spherical aberration (in mm), curvature of field (in mm), distortion and lateral color (in mm) of the rear conversion lens of Embodiment 6 when combined with a main lens having an f number of 3.2 and a focal length of 1. The aberrations illustrated are those of the e-line ($\lambda$=546.1 nm) unless noted otherwise. The wavelength of the C-line is 656.3 nm and of the g-line is 435.8 nm. Also, the curvature of field is illustrated in FIG. 8B for both the sagittal image plane S and the tangential (meridional) image plane T. In these figures, $\omega$ is the half-image angle and $F_{NO}$ is the F-number.

Embodiment 7

Table 8 below lists the surface #, in order from the object side, the radius of curvature R (in mm) of each surface, the spacing D (in mm) between surfaces, as well as the index of refraction $N_e$ (for the e-line, $\lambda$=546.1 nm) and the Abbe number $\nu_d$ (for the d-line, $\lambda$=587.6 nm) of each lens element of the attachment lens of Embodiment 7. In the middle portion of the table are listed the spacing d0 between the rear surface of the main lens and the front surface of the attachment lens, as well as the focal length f (in mm) and magnification M when the attachment lens is attached to the main lens that is normalized to have unity focal length, as described above. In the bottom portion of the table are listed the values that correspond to each of the Conditions (1) to (6) for this embodiment.

TABLE 8

| # | R | D | $N_e$ | $\nu_d$ |
|---|---|---|---|---|
| 1 | 0.72990 | 0.01333 | 1.82017 | 46.4 |
| 2 | 0.20132 | 0.00000 | | |
| 3 | 0.20132 | 0.07501 | 1.59667 | 35.3 |
| 4 | −0.44561 | 0.03803 | | |
| 5 | −0.45316 | 0.01533 | 1.88815 | 40.8 |
| 6 | 0.88788 | 0.03873 | | |
| 7 | −0.25465 | 0.01533 | 1.88815 | 40.8 |
| 8 | −0.63545 | 0.00333 | | |
| 9 | 0.93061 | 0.10533 | 1.52033 | 58.6 |
| 10 | −0.21275 | 0.00000 | | |
| 11 | −0.21275 | 0.02000 | 1.88815 | 40.8 |
| 12 | −0.27899 | 0.41627 | | |
| d0 = 0.10667 | | f = −1.1210 | | M = 1.6748 |
| (1) | (2) | (3) (4) | (5) | (6) |
| $N_3$ | $N_4$ | $N_5$ $N_6$ | $f_{34}/f_{12}$ | $f_3/f_4$ |
| 1.88815 | 1.88815 | 1.52033 1.88815 | −0.2564 | 0.6890 |

As is apparent from comparing the above values of this embodiment corresponding to Conditions (1)–(6) with the Conditions (1)–(6), this embodiment satisfies each of the Conditions (1)–(6).

Figure 9A:
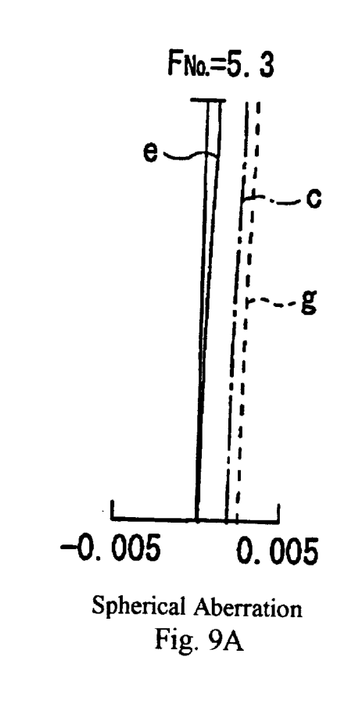
FIGS. 9A–9D show the spherical aberration (in mm), curvature of field (in mm), distortion and lateral color (in mm) of the rear conversion lens of Embodiment 7 when combined with a main lens.
Figure 9B:
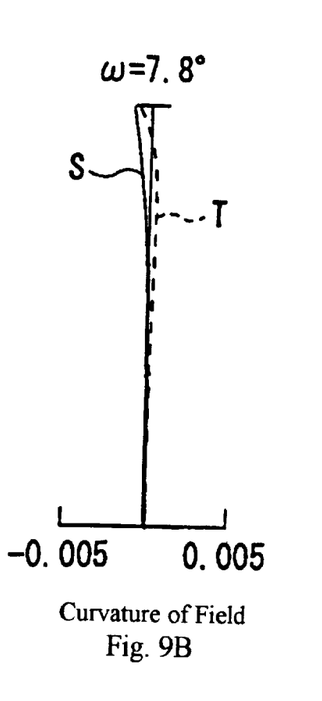
Figure 9C:
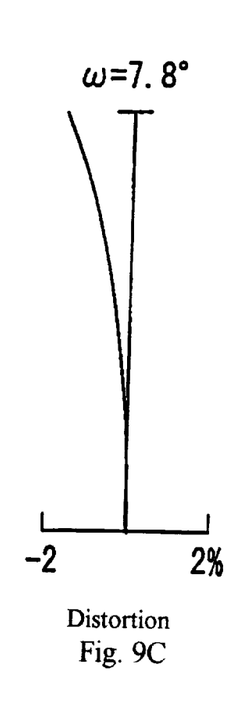
Figure 9D:
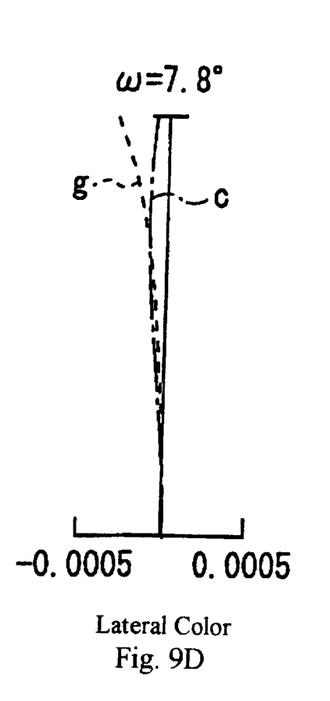

FIGS. 9A–9D show the spherical aberration (in mm), curvature of field (in mm), distortion and lateral color (in mm) of the rear conversion lens of Embodiment 7 when combined with a main lens having an f number of 3.2 and a focal length of 1. The aberrations illustrated are those of the e-line ($\lambda$=546.1 nm) unless noted otherwise. The wavelength of the C-line is 656.3 nm and of the g-line is 435.8 nm. Also, the curvature of field is illustrated in FIG. 9B for both the sagittal image plane S and the tangential (meridional) image plane T. In these figures, $\omega$ is the half-image angle and $F_{NO}$ is the F-number.

Embodiment 8

Table 9 below lists the surface #, in order from the object side, the radius of curvature R (in mm) of each surface, the spacing D (in mm) between surfaces, as well as the index of refraction $N_e$ (for the e-line, $\lambda$=546.1 nm) and the Abbe number $\nu_d$ (for the d-line, $\lambda$=587.6 nm) of each lens element of the attachment lens of Embodiment 8. In the middle portion of the table are listed the spacing d0 between the rear surface of the main lens and the front surface of the attachment lens, as well as the focal length f (in mm) and magnification M when the attachment lens is attached to the main lens that is normalized to have unity focal length, as described above. In the bottom portion of the table are listed the values that correspond to each of the Conditions (1) to (6) for this embodiment.

TABLE 9

| # | R | D | $N_e$ | $\nu_d$ |
|---|---|---|---|---|
| 1 | 0.66703 | 0.01333 | 1.82017 | 46.4 |
| 2 | 0.18142 | 0.00000 | | |
| 3 | 0.18142 | 0.07333 | 1.59667 | 35.3 |
| 4 | −0.54974 | 0.03999 | | |
| 5 | −0.64761 | 0.01533 | 1.88815 | 40.8 |
| 6 | 0.65420 | 0.05878 | | |
| 7 | −0.24917 | 0.01533 | 1.88815 | 40.8 |
| 8 | −0.64455 | 0.00333 | | |
| 9 | 1.02975 | 0.08451 | 1.52033 | 58.6 |
| 10 | −0.21433 | 0.00000 | | |
| 11 | −0.21433 | 0.02000 | 1.88815 | 40.8 |
| 12 | −0.26515 | 0.41666 | | |
| d0 = 0.10667 | | f = −1.1089 | | M = 1.6999 |
| (1) | (2) | (3) (4) | (5) | (6) |
| $N_3$ | $N_4$ | $N_5$ $N_6$ | $f_{34}/f_{12}$ | $f_3/f_4$ |
| 1.88815 | 1.88815 | 1.52033 1.88815 | −0.2072 | 0.7823 |

As is apparent from comparing the above values of this embodiment corresponding to Conditions (1)–(6) with the Conditions (1)–(6), this embodiment satisfies each of the Conditions (1)–(6).

Figure 10A:
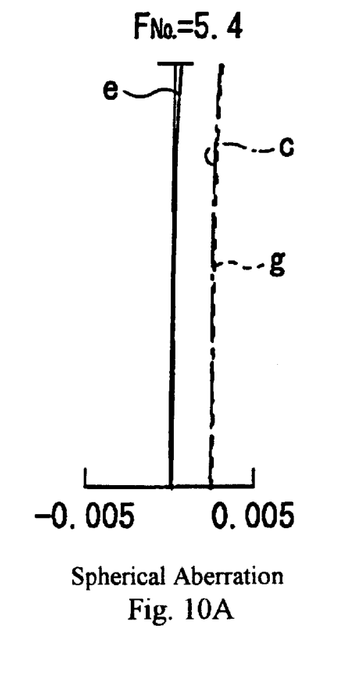
FIGS. 10A–10D show the spherical aberration (in mm), curvature of field (in mm), distortion and lateral color (in mm) of the rear conversion lens of Embodiment 8 when combined with a main lens.
Figure 10B:
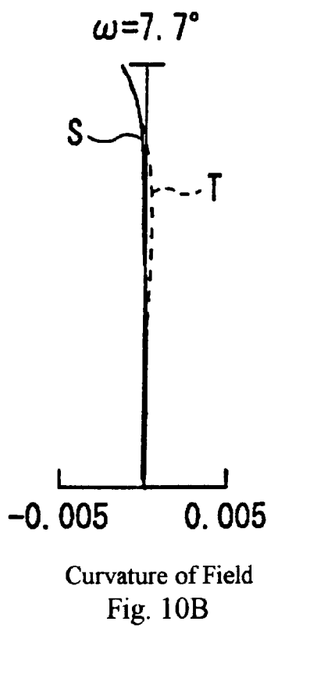
Figure 10C:
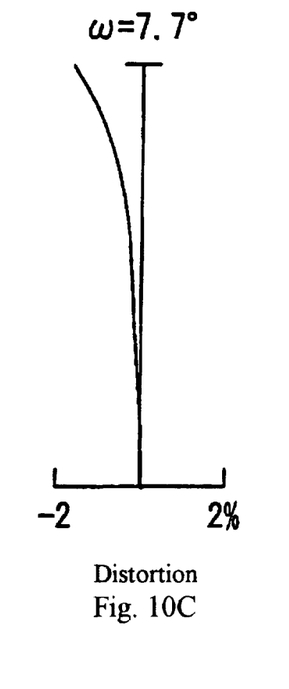
Figure 10D:
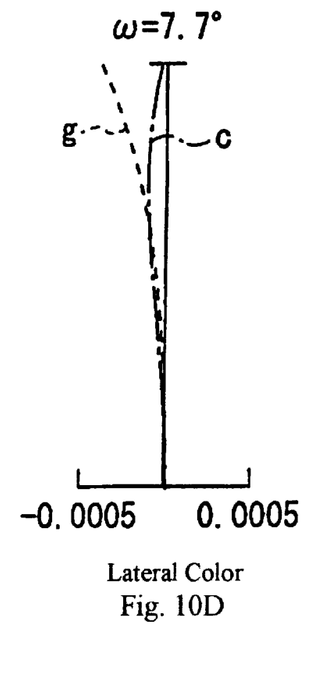

FIGS. 10A–10D show the spherical aberration (in mm), curvature of field (in mm), distortion and lateral color (in mm) of the rear conversion lens of Embodiment 8 when combined with a main lens having an f number of 3.2 and a focal length of 1. The aberrations illustrated are those of the e-line ($\lambda$=546.1 nm) unless noted otherwise. The wavelength of the C-line is 656.3 nm and of the g-line is 435.8 nm. Also, the curvature of field is illustrated in FIG. 10B for both the sagittal image plane S and the tangential (meridional) image plane T. In these figures, $\omega$ is the half-image angle and $F_{NO}$ is the F-number.

As is evident from the aberration figures for each embodiment, the aberrations of the rear conversion lens of the invention when attached to the main lens for all the above embodiments are favorably corrected so as to provide good optical performance even when photographing with a film size larger than 35 mm, and at magnifications in the range 1.5X to 2.0X.

The invention being thus described, it will be obvious that the same may be varied in many ways. For example, the values of the radius of curvature R and spacing D of the above embodiments may be readily scaled, and different materials may be used for the lens elements. Further, the attachment lens of the invention may be attached to another main lens than that discussed above. In addition, the spherical aberration of the attachment lens is corrected sufficiently so as to provide good optical performance even when the attachment lens is attached to a main lens having an f number of about 2, and the curvature of field is sufficiently well-corrected so as to provide good optical performance even if the attachment lens is attached to a main lens having a focal length as short as about 0.5 m. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A rear conversion lens for insertion between a main lens system and its image surface in order to increase the focal length of the main lens system, said rear conversion lens formed of three lens groups, in order from the object side, as follows:
   a first lens group of positive refractive power, said first lens group formed of, in sequential order from the object side, a first lens element of negative refractive power having a meniscus shape with its convex surface on the object side, and a second lens element of positive refractive power that is biconvex;
   a second lens group of negative refractive power, said second lens group formed of, in sequential order from the object side, a third lens element that is biconcave, and a fourth lens element of negative refractive power and having a concave surface on the object side; and
   a third lens group of positive refractive power, said third lens group formed of, in sequential order from the object side, a fifth lens element that is biconvex, and a sixth lens element of negative refractive power and having a meniscus shape, with its convex surface on the image side.

2. The rear conversion lens as described in claim 1, wherein the following four conditions are satisfied:

$$N_3 > 1.8$$
$$N_4 > 1.8$$
$$N_5 < 1.6$$
$$N_6 > 1.8$$

where $N_3$ is the index of refraction of the third lens element,
$N_4$ is the index of refraction of the fourth lens element,
$N_5$ is the index of refraction of the fifth lens element, and
$N_6$ is the index of refraction of the sixth lens element.

3. The rear conversion lens as described in claim 2, wherein the following two conditions are satisfied:

$$-0.28 < f_{34}/f_{12} < -0.18$$
$$0.5 < f_3/f_4 < 2.0$$

where $f_{12}$ is the focal length of the first lens group,
$f_{34}$ is the focal length of the second lens group,
$f_3$ is the focal length of the third lens element, and
$f_4$ is the focal length of the fourth lens element.

4. The rear conversion lens as described in claim 1, wherein the following two conditions are satisfied:

$$-0.28 < f_{34}/f_{12} < -0.18$$
$$0.5 < f_3/f_4 < 2.0$$

where $f_{12}$ is the focal length of the first lens group,
$f_{34}$ is the focal length of the second lens group,
$f_3$ is the focal length of the third lens element, and
$f_4$ is the focal length of the fourth lens element.

* * * * *